United States Patent [19]
Meunier et al.

[11] Patent Number: 5,520,241
[45] Date of Patent: May 28, 1996

[54] MACHINE FOR REMOVING BURRS FROM SLABS ISSUING FROM A CONTINUOUS CASTING INSTALLATION AND ROTOR EMPLOYED IN THIS TYPE OF BURR-REMOVING MACHINE

[75] Inventors: Jacques Meunier, Petite; Francis Coppin, Hazebrouck; Dominique Duval, Oyes Plage, all of France

[73] Assignee: Sollac, Puteaux, France

[21] Appl. No.: 329,727

[22] Filed: Oct. 26, 1994

[30] Foreign Application Priority Data

Nov. 18, 1993 [FR] France ................................. 93 13794

[51] Int. Cl.⁶ .................................................. B22D 11/126
[52] U.S. Cl. ............................ 164/263; 164/70.1; 83/869
[58] Field of Search ...................... 164/262, 263, 164/70.1, 460; 83/869, 15

[56] References Cited

FOREIGN PATENT DOCUMENTS

| 198768 | 10/1986 | European Pat. Off. . |
|--------|---------|----------------------|
| 3700207 | 1/1987 | Germany . |
| 3700207 | 7/1988 | Germany . |
| 4-231154 | 8/1992 | Japan . |
| 4-270044 | 9/1992 | Japan . |
| 2059839 | 4/1981 | United Kingdom . |
| WO90/6195 | 6/1990 | WIPO . |

*Primary Examiner*—Richard K. Seidel
*Assistant Examiner*—Randolph S. Herrick
*Attorney, Agent, or Firm*—Cushman, Darby & Cushman

[57] ABSTRACT

The machine for removing burrs from slabs (1) issuing from a continuous casting installation and cut to the desired length by oxygen cutting, is of the type comprising a rotor (10) carrying on its periphery self-retractable hammers (11). The rotor (10) comprises a hub (12) on which are fixed, at each end, an end flange (13) in the form of a circular collar and, between these two end flanges (13), pairs (14) of semi-flanges (15) which are in the form of semi-circular collars and are adjacent and opposed. Each pair (14) of semi-flanges (15) is evenly spaced apart in the longitudinal direction of the hub (12) and one of the semi-flanges (15) of each pair (14) is offset in this longitudinal direction relative to the other of the semi-flanges (15) of this pair (14). The invention also provides a rotor employed in this type of burr-removing machine.

9 Claims, 6 Drawing Sheets

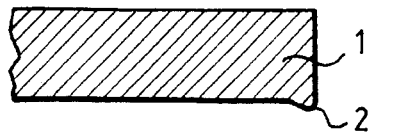
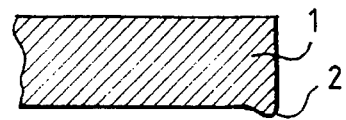
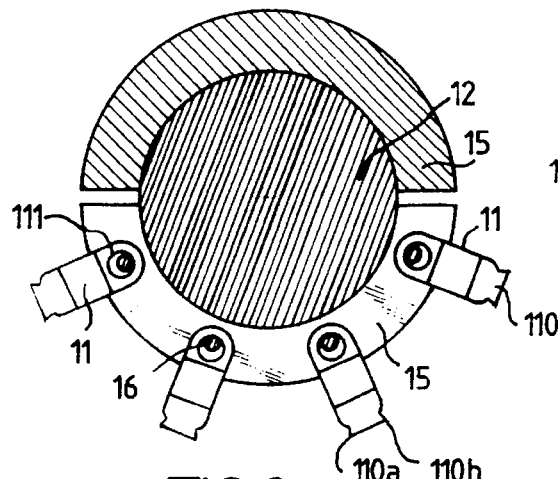
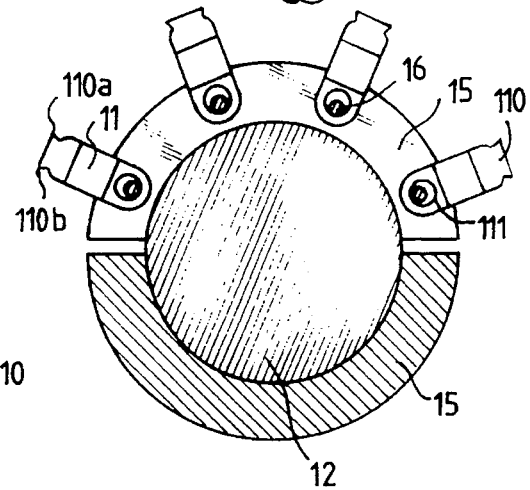
FIG. 3     FIG. 4
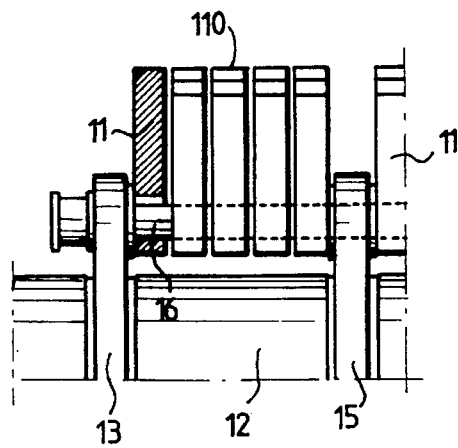
FIG. 5
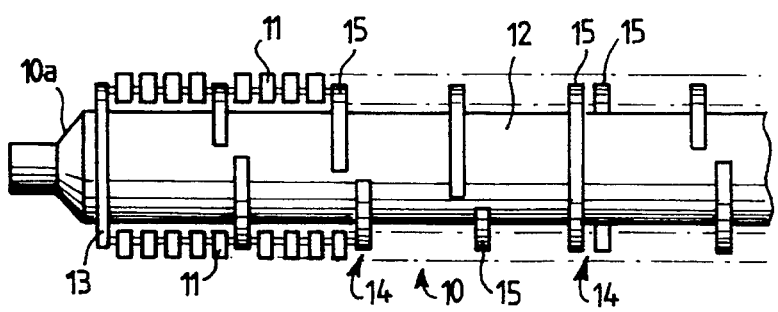
FIG. 6

MACHINE FOR REMOVING BURRS FROM SLABS ISSUING FROM A CONTINUOUS CASTING INSTALLATION AND ROTOR EMPLOYED IN THIS TYPE OF BURR-REMOVING MACHINE

BACKGROUND OF THE INVENTION

The present invention relates to a machine for removing burrs on slabs issuing from a continuous casting installation and which are cut to a desired length by oxygen cutting.

The present invention also relates to a rotor for this type of machine for removing burrs on slabs.

The continuous casting of steel permits obtaining a product which is in the form of a thick strip of steel which has to be cut to given lengths so as to form slabs which are then treated in subsequent rolling operations.

The product issuing from the continuous casting installation is converted into slabs by oxygen cutting by means of a torch which projects its jet in a direction perpendicular to one of the faces of the steel strip. Burrs of molten steel are produced on the face opposed to that receiving the jet.

These burrs, constituted by oxygen-cutting residues, are formed due to the disturbance in the discharge of the cutting residues produced by the expansion of the residual gases on the exit side of the cutting slit.

The effect of this phenomenon causes an adhesion of the undischarged residues on each end edge of the inner face of the slabs.

For the purpose of eliminating these burrs, there is known from FR-A-2 467 041 a burr-removing machine comprising a group of cutting blades carried by a carriage of which the translation along the longitudinal axis of the slab under the lower face of the carriage. After the cutting edges have been put into contact with the face, the oxygen-cutting residues are cut off.

However, this burr-removing machine requires immobilizing the slab for the burr-removing operation. Moreover, it is advisable to provide two opposed symmetrical machines in facing relation to the same face of this slab, respectively for eliminating the burrs at the head end and the tail end of the slab.

This immobilization of each slab is an operation which is extremely detrimental to the productivity of the installation. Furthermore, the presence of two machines substantially increases the cost.

Further, there is known from FR-A-2 580 203 a rotary machine comprising a rotor mounted horizontally in a stand and carrying on its periphery retractable hammers having heads which describe an envelope which is brought to a position substantially tangent to the lower face of the slab.

The machine is placed under the principal lower face of the slab of which the head and tail end edges include burrs, the axis of the rotor being disposed parallel to the face of the slab and at such distance therefrom that the heads of the hammers driven in rotation describe a circular envelope tangent to the lower face of this slab and in this way tear away the burrs projecting from this face.

In this machine, the rotor comprises a hub on which bearing flanges are fixed in evenly spaced apart positions in the direction of the longitudinal axis of the hub.

These bearing flanges receive a group of articulation pins evenly spaced apart on the periphery of the bearing flanges. The hammers are mounted on the articulation pins.

Such a construction provides on the same line a series of successive hammers, in side-by-side relation, except in the region of the bearing flanges.

Thus, the burrs are only torn away in the region of the hammers and not in the region of the bearing flanges.

The burr portions which have not been removed by the burr-removing machine must consequently be torn away manually, for example by means of a grinding wheel.

SUMMARY OF THE INVENTION

An object of the invention is therefore to avoid these drawbacks by providing a machine for removing burrs on slabs which require no immobilization thereof when removing the burrs and which tears away all of the burrs.

The invention therefore provides a machine for removing burrs from slabs, issuing from a continuous casting installation and cut to a desired length by oxygen cutting. The machine comprises a rotor mounted horizontally in a stand and carrying on its periphery self-retractable hammers the heads of which describe an envelope upon the rotation of the rotor, and means for vertically displacing the rotor so as to bring the envelope described by the hammers to a position substantially tangent to the lower face of the slabs. The rotor comprises a hub on which are fixed, at each end, an end flange in the form of a circular collar and, between the two end flanges, pairs of semi-flanges in the form of semi-circular collars, which are adjacent and opposed, with each pair of semi-flanges being evenly spaced apart in the longitudinal direction of the hub. One of the semi-bearing flanges of each pair is offset in the longitudinal direction relative to the other of the semi-flanges of said pair. The end flanges and the semi-flanges receive a group of articulation pins parallel to the axis of the hub and carry the hammers.

According to other features of the invention:

the pairs of semi-flanges are symmetrical relative to each other, the longitudinal plane of separation of the two semi-flanges of a pair is offset by an angle of 45° or 90° relative to the longitudinal plane of separation of the two semi-flanges of the preceding pair, each of the hammers has the shape of an elongate mass of which one of the ends constituting the head has a dovetail shape, and of which the other end comprises a bore having a diameter larger than the diameter of the articulation pins carrying said hammers.

The invention also provides a rotor for a machine for removing burrs from slabs issuing from a continuous casting installation and cut to the desired length by oxygen cutting, where the rotor carries on its periphery self-retractable hammers. The rotor comprises a hub on which are fixed, at each end, an end flange in the form of a circular collar and, between these two end flanges, pairs of semi-flanges in the form of semi-circular collars, which are adjacent and opposed. Each pair of semi-flanges is evenly spaced apart in the longitudinal direction of the hub and one of the semi-flanges of each pair is offset in the longitudinal direction relative to the other of the semi-flanges of the pair. The end flanges and the semi-flanges receive a group of articulation pins parallel to the axis of the hub and carry the hairs.

According to other features of the invention:

the pairs of semi-flanges are symmetrical relative to each other, and the longitudinal plane of separation of two semi-flanges of a pair is offset by an angle of 45° or 90° relative to the longitudinal plane of separation of the two semi-flanges of the preceding pair.

BRIEF DESCRIPTION OF THE DRAWINGS

The features and advantages of the invention will be apparent from the following description which is given solely by way of example with reference to the accompanying drawings, in which:

FIG. 3 is a sectional view taken on line 3—3 of FIG. 1, FIG. 4 is a sectional view taken on line 4—4 of FIG. 1, FIG. 5 is a partial elevational view of the auto-retractable hammers disposed on the periphery of the rotor, one of the hammers being shown in section, FIG. 6 is a diagrammatic elevational view of an alternative embodiment of the rotor of the burr-removing machine according to the invention.

DETAILED DESCRIPTION OF THE INVENTION

Figure 1:
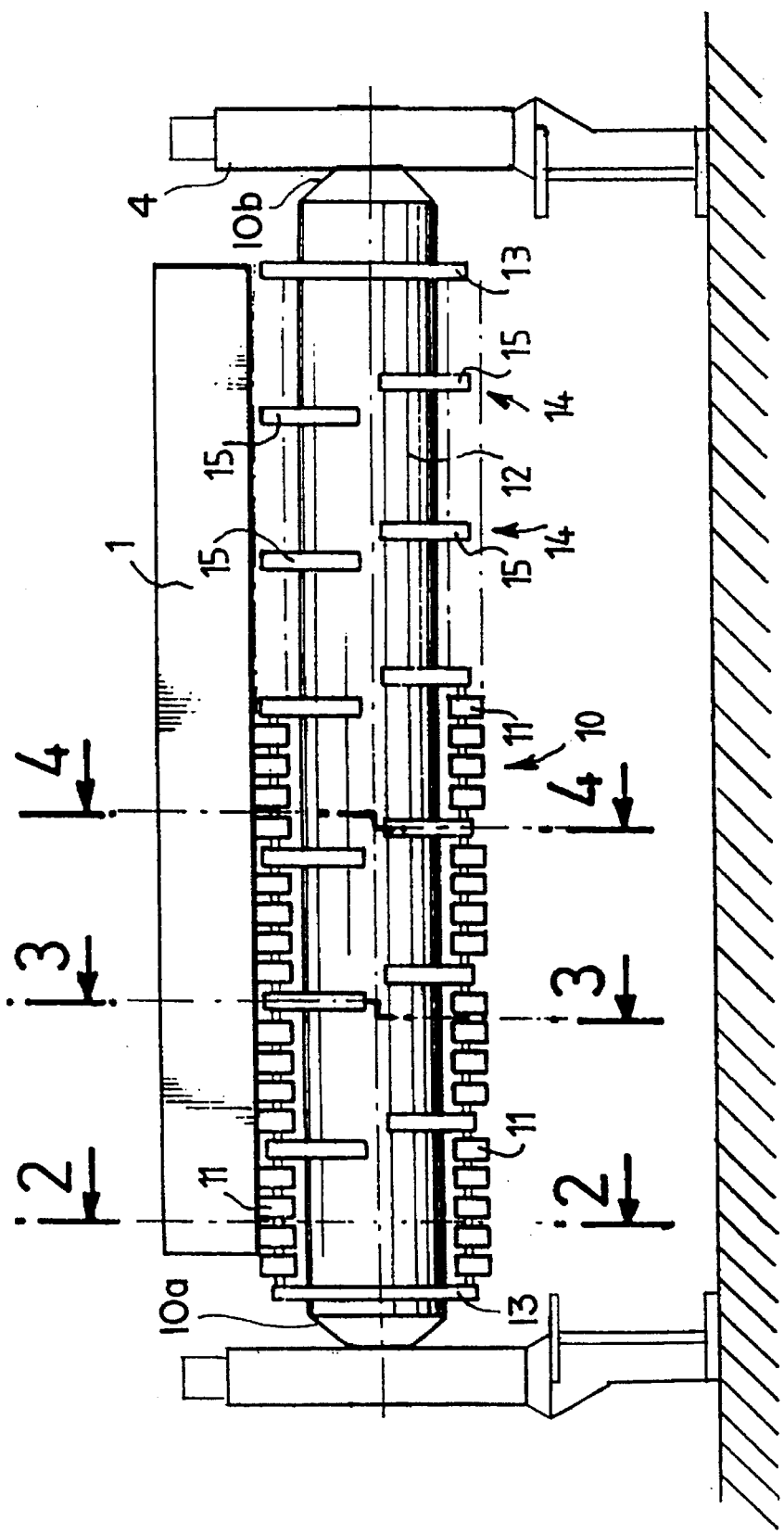
FIG. 1 is a diagrammatic elevational view of the rotor of the burr-removing machine according to the invention.
Figure 2:
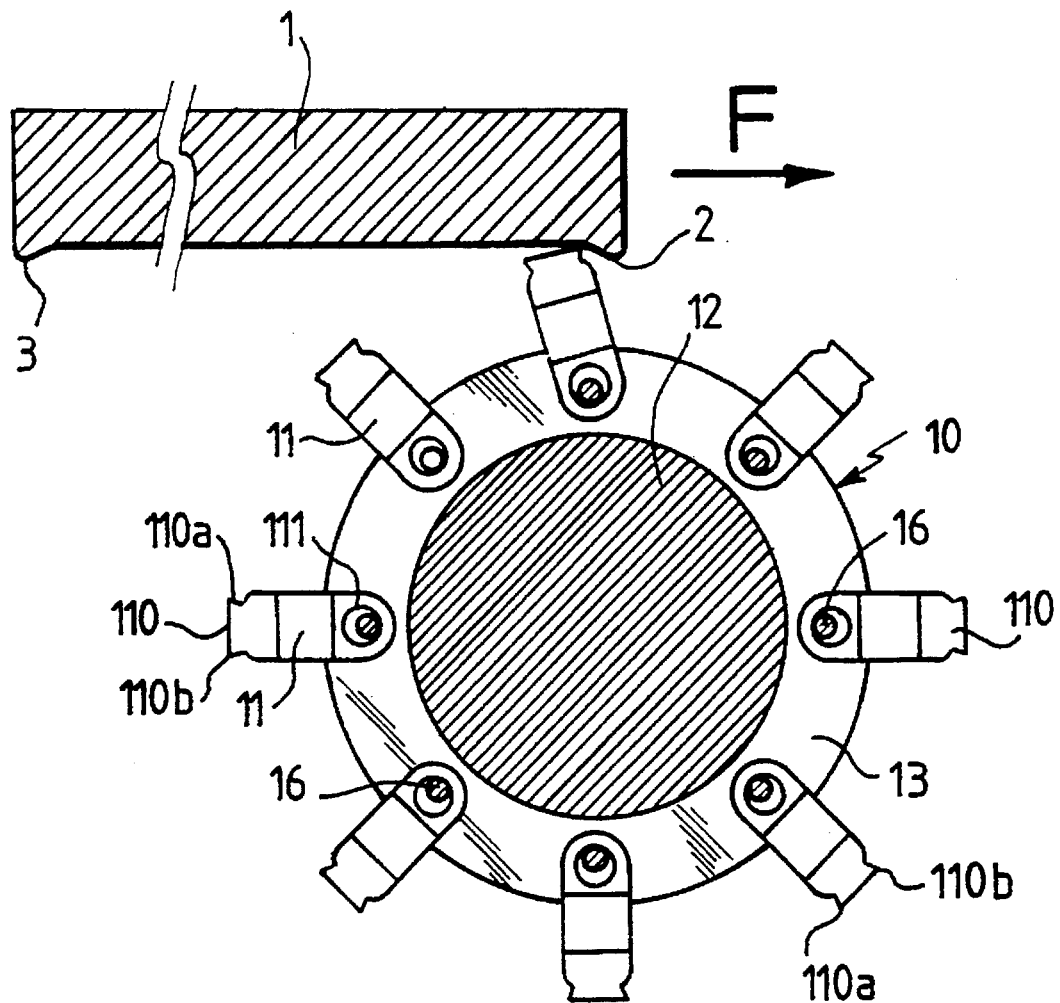
FIG. 2 is a sectional view taken on line 2—2 of FIG. 1.

As shown in FIGS. 1 and 2, a slab 1 which has been previously cut to the desired length by oxygen cutting at a station (not shown) on the upstream side relative to the direction of travel of the slab 1 indicated by the arrow F, comprises burrs 2 and 3 along the edges of the ends of its lower face.

The burr-removing machine comprises a rotor 10 provided on its periphery with self-retractable hammers 11 driven in rotation by the rotor 10.

The rotor 10 comprises a hub 12 on which are fixed, at each end 10a and 10b, a bearing flange 13 in the form of a circular collar and, between these end flanges 13, pairs of semi-flanges 14 in the form of adjacent and opposed semi-circular collars. The ends 10a and 10b are connected to a stand 4 for rotor 10.

Each pair 14 of semi-flanges 15 is evenly spaced apart in the longitudinal direction of the hub 12 and one of the semi-flanges 15 of each pair 14 is offset in the longitudinal direction of the hub 12 relative to the other of the semi-flanges 15 of said pair 14.

As shown in FIGS. 2 to 5, the end flanges 13 and the semi-flanges 15 receive a number of articulation pins 16 disposed at equal distances from the axis of the hub 12 and evenly spaced apart on the periphery of the end flanges 13 and the semi-flanges 15.

According to the embodiment shown in the Figures, eight pins 16 are disposed between the end flanges 13 and the semi-flanges 15, although the number of articulation pins may be different.

The hammers are freely mounted on the articulation pins 16. These hammers 11 are in the form of an elongate mass of which one of the ends constituting the head 110 has a dovetail shape, and the other end comprises a bore 111 having a diameter larger than the diameter of the respective articulation pin 16, so that a radial clearance is provided between these two elements.

As shown in FIG. 5, a number of hammers 11 is mounted on a common articulation pin 16 passing through all of the pairs 14 of semi-flanges 15 and extending from one end flange 13 to the other in a direction parallel to a generatrix of the hub 12.

The dovetail-shaped heads 110 of the hammers 11 have two symmetrical edges 110a and 110b so that the hammers 11 can be employed in either direction of rotation of the rotor 10.

The hammers 11 are self-retractable and driven in rotation by the hub 12 and, under the effect of centrifugal force, take up a radial position at a maximum distance from the axis of the hub 12.

The position of the axis of the hub 12 with respect to the lower face of the slab 1 is adjusted by vertical shifting means (not shown) for the hub 12 in such manner that, upon rotation of the rotor 10, the envelope described by the edges 110a and 110b of the heads 110 is substantially tangent to the lower face of the slab 1 and intersects the burrs 2 or 3.

The impact of one of the edges 110a and 110b of the head 110 of the hammers 11 on the burr 2 or 3 provides the energy required to tear away this burr.

Under the effect of the impact, the first hammer 11 becomes angularly retracted if its energy is insufficient to tear away the burr in a first pass of the machine, and the following hammer 11 comes to strike against the remainder of the burr until the latter is completely eliminated. In this way it is possible to adjust, as a function of the speed of displacement of the slab 1, the speed of rotation of the hub 12 to obtain a complete elimination of the burr by successive impacts of the hammers 11 on the latter.

The number of articulation pins 16 carrying the hammers 11 is determined by the speed of rotation of the hub 12, the speed of displacement of the slab 1 and the required number of impacts on the burr to tear it away upon its passage over the burr-removing machine.

The offset in the longitudinal direction of the hub 12 of one of the semi-flanges 15 of each pair 14 relative to the other of the semi-flanges 15 of this pair, forms a continuous line of successive hammers 11 in side-by-side relation, even in the region of the semi-flanges 15.

Figure 7:
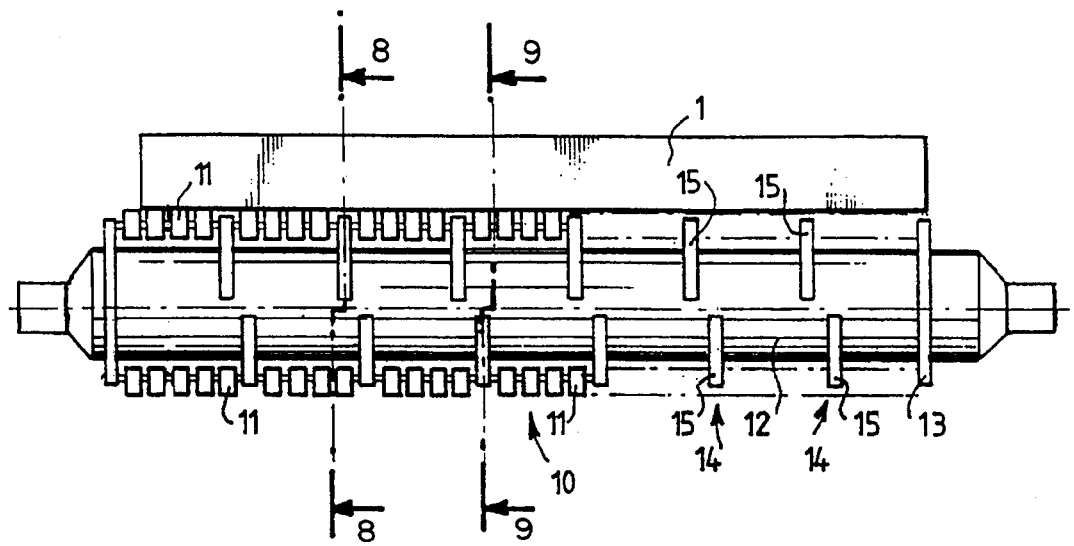
FIG. 7 is a sectional view of the rotor according to the present invention.
Figure 8:
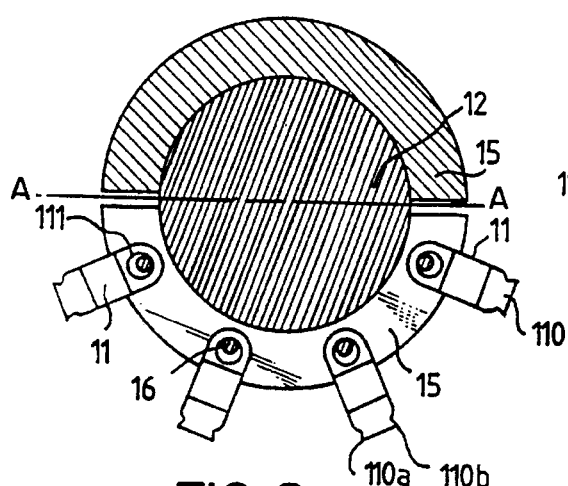
FIGS. 8 and 9 illustrate the plane of separation between two adjacent pairs of semi-flanges, with the plane being the same for both pairs of semi-flanges, with FIG. 8 being taken along the line 8—8 in FIG. 7 and FIG. 9 being taken along the line 9—9 in FIG. 7.
Figure 9:
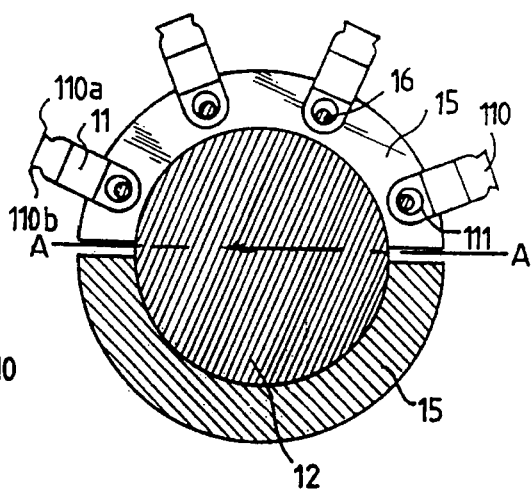

In a first embodiment shown in FIG. 1, the pairs 14 of semi-flanges 15 are symmetrical to each other. This embodiment is depicted in FIGS. 8 and 9, both cross sections from FIG. 7. As is clear, both pairs of semi-flanges 14, 15 have the same longitudinal plane A of separation.

Figure 10:
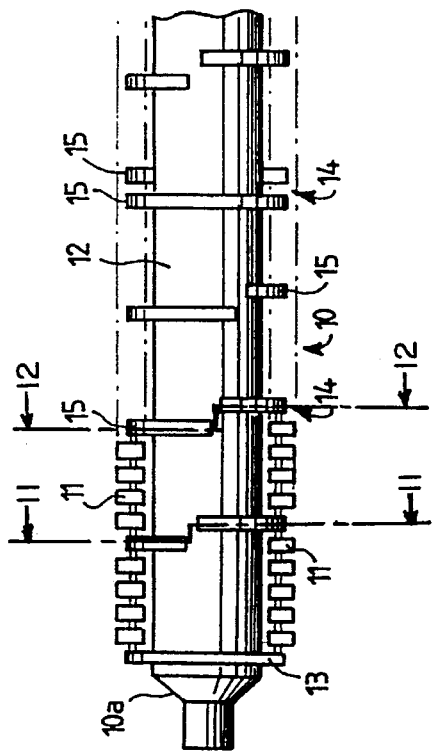
FIG. 10 is a sectional view of the rotor according to the present invention.
Figure 12:
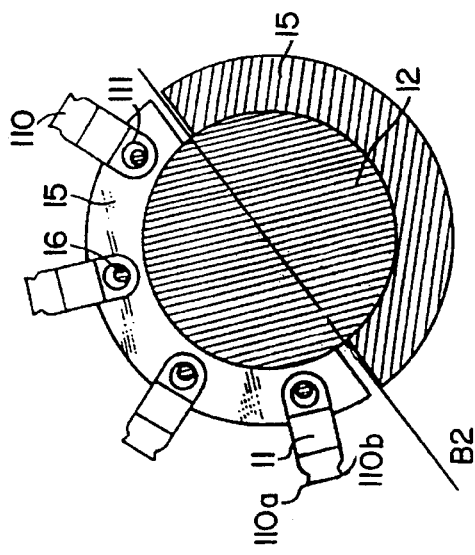
FIGS. 11 and 12 illustrate the plane of separation between two adjacent pairs of semi-flanges, with the plane being offset at an angle of 45° for the two pairs of semi-flanges.
Figure 11:
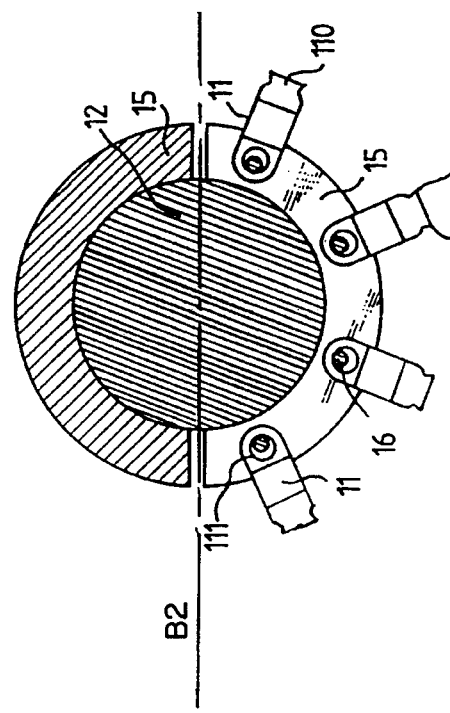

In a second embodiment shown in FIG. 6, the longitudinal plane of separation of two semi-flanges 15 of a pair 14 is offset by an angle 45° relative to the longitudinal plane of separation of the two semi-flanges 15 of the preceding pair 14. This embodiment is shown in FIGS. 11 and 12, which are cross sections from FIG. 10. FIGS. 11 and 12 illustrate plane B2 being rotated at an angle of 45° between adjacent pairs of semi-flanges.

Figure 14:
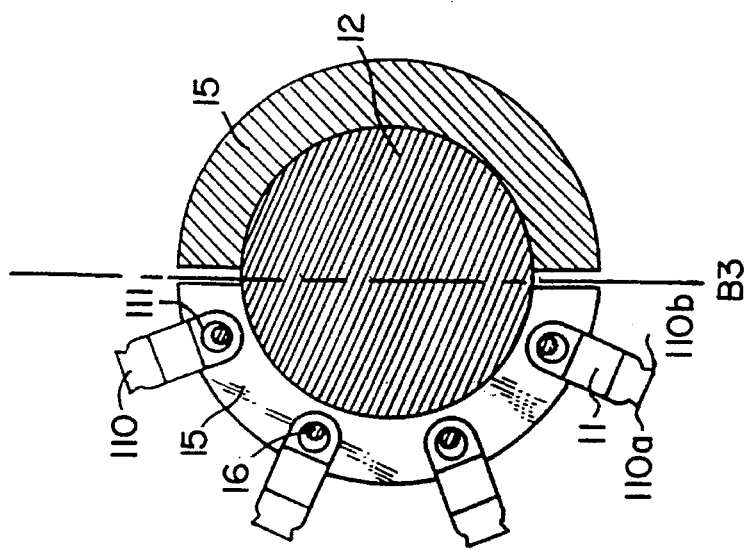
FIGS. 13 and 14 illustrate the plane for separation between two adjacent pairs of semi-flanges, with the plane being offset at an angle of 90° for the two pairs of semi-flanges.
Figure 13:
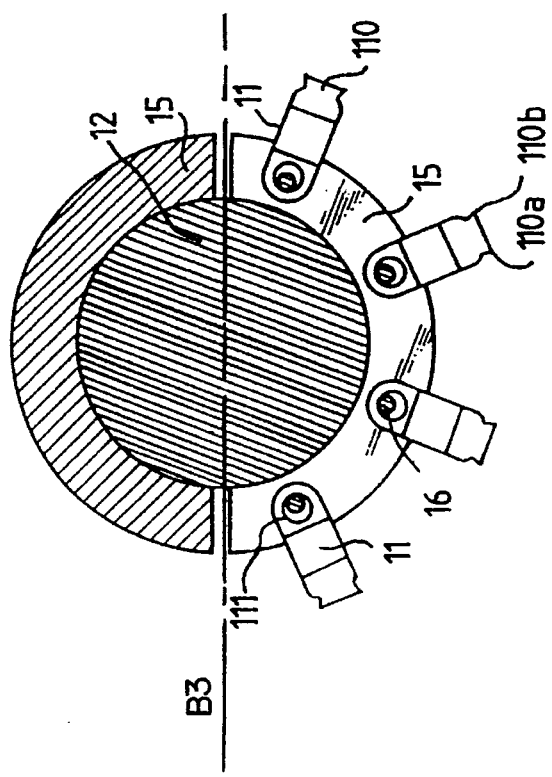

Further, the longitudinal plane of separation of two semi-flanges 15 of a pair 14 may be offset by an angle of 30° or 90° relative to the longitudinal plane of separation of the two semi-flanges 15 of the preceding pair 14, which permits a better distribution of the regions of the rotor 10 which are devoid of hammers 11. The embodiment where the plane B3 is rotated by 90° between adjacent pairs of semi-flanges is shown in FIGS. 13 and 14, which are cross sections similar to those in FIGS. 11 and 12.

The burr-removing machine according to the invention permits acting on the burr of the slab by a hammer on the whole of the length of the burr.

What is claimed is:

1. A machine for removing burrs from a slab issuing from a continuous casting installation and which have been cut to a desired length by oxygen cutting, said machine comprising:

a stand;

a rotor mounted horizontally on said stand;

a plurality of self retractable hammers disposed on a peripheral surface of said rotor, wherein said self-retractable hammers includes heads that describe an envelope upon rotation of said rotor; and means for vertically displacing said rotor so as to bring said envelope described by said hammers into a position where said envelope is substantially tangent to a lower face of said slab;

wherein said rotor comprises:
   a hub;
   an end flange formed as a circular collar fixed adjacent to each end of said hub; and
   a plurality of pairs of semi-flanges, each pair of semi-flanges including a first semi-flange and a second semi-flange;
   wherein said first semi-flange and said second semi-flange in each of said pairs of semi-flanges are formed as semi-circular collars that are adjacent to each other and disposed on opposite sides of a longitudinal axis of said hub;
   wherein adjacent pairs of said plurality of pairs are evenly spaced along said hub, with said first semi-flange being offset from said second semi-flange in a longitudinal direction; and
   a plurality of articulation pins mounted to said end flanges and said semi-flanges and extending in a direction parallel to an axis of said hub, with said hammers being freely pivotable and mounted to said pins.

2. A machine according to claim 1, wherein said pairs of semi-flanges are symmetrical relative to each other.

3. A machine according to claim 1, wherein said first and second semi-flanges is offset by an angle of 45° relative to the first and second semi-flanges of a preceding pair.

4. A machine according to claim 1, wherein said first and second semi-flanges is offset by an angle of 90° relative to the first and second semi-flanges of a preceding pair.

5. A machine according to claim 1, wherein each of said hammers is shaped as an elongate mass having an end portion including a hammer head with a dovetail shape and an end portion opposite said hammer head defining a bore having a diameter larger than a diameter of said articulation pins.

6. A rotor for a machine for removing burrs from a slab issuing from a continuous casting installation and cut to a desired length by oxygen cutting, said rotor having retractable hammers disposed on an outer peripheral surface thereof, said rotor comprising:

a hub having first and second ends;

an end flange formed as a circular collar disposed adjacent to said first and second ends;

a plurality of pairs of semi-flanges disposed between said end flanges at said first and second ends, said semi-flanges having a form of semi-circular collars that are adjacent to each other and opposed, each pair of semi-flanges being evenly spaced apart from adjacent pairs in a longitudinal direction of said hub; and a plurality of articulation pins mounted in said end flanges and said semi-flanges and extending in a direction parallel to said longitudinal direction of said hub;

wherein one of said semi-flanges of each pair is offset from the other semi-flange of said pair; and wherein said hammers are pivotally mounted to said pins.

7. A rotor according to claim 6, wherein each of the semi-flanges of each of said pairs is symmetrical relative to the other semi-flange of said pair.

8. A rotor according to claim 6, wherein the two semi-flanges in each pair is offset by an angle of 45° relative to the two semi-flanges of a preceding pair.

9. A rotor according to claim 6, wherein the two semi-flanges in each pair is offset by an angle of 90° relative to the two semi-flanges of a preceding pair.

* * * * *